United States Patent
Kawasaki et al.

[11] Patent Number: 5,599,885
[45] Date of Patent: Feb. 4, 1997

[54] PROCESS FOR THE PREPARATION OF POLYOLEFIN

[75] Inventors: Masaaki Kawasaki; Yoshio Miyake; Tomoko Sueyoshi; Atsuo Kobata, all of Yamaguchi, Japan

[73] Assignee: Mitsui Petrochemical Industries, Ltd., Tokyo, Japan

[21] Appl. No.: 461,950

[22] Filed: Jun. 5, 1995

Related U.S. Application Data

[63] Continuation of Ser. No. 254,440, Jun. 6, 1994, abandoned, which is a continuation of Ser. No. 6,985, Jan. 21, 1993, abandoned.

[30] Foreign Application Priority Data

Jan. 23, 1992 [JP] Japan .................................. 4-010299
Jan. 24, 1992 [JP] Japan .................................. 4-011414

[51] Int. Cl.⁶ .................................................. C08F 2/06
[52] U.S. Cl. .......................... 526/68; 526/69; 526/70; 526/153; 526/160; 526/943; 502/152
[58] Field of Search .................... 526/68, 69, 70, 526/153, 160

[56] References Cited

U.S. PATENT DOCUMENTS

| | | | |
|---|---|---|---|
| 4,433,121 | 2/1984 | Kabu et al. | 526/68 |
| 4,564,647 | 1/1986 | Hayashi et al. | 523/211 |
| 4,752,597 | 6/1988 | Turner | 502/104 |
| 4,923,833 | 5/1990 | Kioka et al. | 502/9 |
| 4,952,540 | 8/1990 | Kioka et al. | 502/9 |
| 5,122,491 | 6/1992 | Kioka et al. | 502/117 |
| 5,171,799 | 12/1992 | Kioka et al. | 526/127 |

FOREIGN PATENT DOCUMENTS

| | | |
|---|---|---|
| 0279586 | 8/1988 | European Pat. Off. |
| 0327649 | 8/1989 | European Pat. Off. |
| 0360492 | 3/1990 | European Pat. Off. |
| 0519236 | 12/1992 | European Pat. Off. |

*Primary Examiner*—David W. Wu
*Attorney, Agent, or Firm*—Sherman and Shalloway

[57] ABSTRACT

A process for the preparation of polyolefin which comprises polymerizing or copolymerizing olefin in the presence of a catalyst for olefin polymerization comprising (A) a metallocene compound of a transition metal selected from the Group IVB of the periodic table, and (B) an organoaluminum oxy-compound; wherein the organoaluminum oxy-compound (B) is added to the polymerization system in the form of a slurry in an aliphatic hydrocarbon or alicyclic hydrocarbon, and the polymerization is carried out in the presence of the aliphatic hydrocarbon diluent or an alicyclic hydrocarbon diluent having a boiling point below 100° C. In an embodiment of the invention a polymer solution containing the resulting polyolefin obtained from the polymerization process is fed to a separation zone kept at a temperature of not lower than the upper cloud point of the polymer solution to separate the polymer solution into a lower phase portion containing the polyolefin in a high concentration and an upper phase portion, so as to recover the polyolefin from the lower phase portion in the separation zone and to recycle at least a part of the upper phase portion to the polymerization zone.

13 Claims, 4 Drawing Sheets

PROCESS FOR THE PREPARATION OF POLYOLEFIN

This application is a continuation of application Ser. No. 08/254,440, filed Jun. 6, 1994, now abandoned, which is a continuation of Ser. No. 08/006,985, filed Jan. 21, 1993, now abandoned.

FIELD OF THE INVENTION

The present invention relates to a process for the preparation of polyolefin by a liquid phase polymerization. More particularly, the invention relates to a process for the preparation of polyolefin in which a drying step of the resulting polymer can be simplified and polyolefin having no odor of a diluent (solvent) for polymerization can be easily prepared. The invention also relates to a process for the preparation of polyolefin in which polyolefin having excellent physical properties such as high transparency and a small change of heat-sealing strength with time can be efficiently prepared through simplified steps.

BACKGROUND OF THE INVENTION

Low-crystalline ethylene copolymers such as ethylene-α-olefin copolymers have been heretofore used widely as modifiers for thermoplastic resins such as polyethylene, polypropylene and an ethylene/vinyl acetate copolymer.

Polyolefins including these ethylene copolymers have been conventionally prepared by a solution polymerization process or the like using a titanium type catalyst formed from a titanium compound and an organoaluminum compound or using a vanadium type catalyst formed from a vanadium compound and an organoaluminum compound.

Recently, a novel Ziegler type catalyst for olefin polymerization formed from a transition metal compound such as zirconocene and an organoaluminum oxy-compound has been proposed as the catalyst for olefin polymerization, and it is known that this Ziegler type catalyst is able to polymerize or copolymerize olefin with high activities and to prepare olefin copolymers which are excellent in composition distribution (i.e., olefin copolymers having narrow composition distribution).

The organoaluminum oxy-compound mentioned as above is generally prepared by bringing an organoaluminum compound such as trialkylaluminum into contact with hydrate of metal salt in a hydrocarbon solvent. In this case, aromatic hydrocarbon which well dissolves the resulting organoaluminum oxy-compound, especially toluene, is used as the hydrocarbon solvent. If the organoaluminum compound is brought into contact with the hydrate of metal salt in an aliphatic hydrocarbon solvent such as hexane, the resulting organoaluminum oxy-compound is difficultly separated from the metal salt because the organoaluminum oxy-compound is hardly dissolved in the aliphatic hydrocarbon solvent.

Accordingly, the organoaluminum oxy-compound has been conventionally prepared in the form of a solution containing said organoaluminum oxy-compound in aromatic hydrocarbon such as toluene, that is, in the form of a toluene solution of the organoaluminum oxy-compound, and the solution has been added to the polymerization system.

By the way, when polyolefin is prepared by polymerizing or copolymerizing olefin in a liquid phase in accordance with a solution polymerization process, the resulting polymer (i.e., polyolefin) is obtained in the form of a polymer solution wherein polyolefin is dissolved in a solvent, and therefore it is necessary to separate the polyolefin from the solution to obtain the polyolefin.

If toluene is used as a solvent for polymerization as described above, there is involved such a problem that the drying step of the above-mentioned polymer solution under heating or at a reduced pressure to dry the resulting polymer can be hardly simplified because toluene has a high boiling point. Further, there is other problem that toluene has an offensive odor and the odor of toluene tends to remain in the resulting polymer.

It can be thought that benzene is used instead of toluene, but the use of benzene is unfavorable in view of industrial hygiene.

Accordingly, there has been eagerly desired the advent of such a process for preparing polyolefin that when polyolefin is prepared by solution polymerization or the like in the presence of a hydrocarbon solvent, the drying step of the resulting polymer can be simplified, and that polyolefin having no odor of the solvent for polymerization can be easily prepared.

For efficiently separating and recovering the resulting polyolefin from the aforesaid polymer solution, Japanese Patent Laid-Open Publication No. 58(1983)-7402 discloses a polymerization process which is characterized in that the polymer solution is fed to a separation zone to separate the polymer solution into a lower phase portion containing the resulting copolymer in a high concentration and an upper phase portion containing the resulting copolymer in a low concentration, then the copolymer is recovered from the lower phase portion, and at least a part of the upper phase portion is recycled to the polymerization reaction. Further, Japanese Patent Laid-Open Publication No. 59(1984)-206416 discloses a process for preparing polybutene-1, which is characterized in that the polymer solution is fed to a separation zone kept at a temperature of not lower than the upper cloud point of the polymer solution to separate the polymer solution into a lower phase portion and an upper phase portion, then the resulting polybutene-1 is recovered from the lower phase portion in the separation zone, and at least a part of the upper phase portion is recycled to a polymerization zone.

In each of the processes for preparing polyolefin described in the above publications, a highly active catalyst composed of a solid titanium catalyst component and an organoaluminum compound is used as a catalyst, and according to those processes, separation of the resulting polymer from the polymer solution can be efficiently carried out, and moreover polyolefin such as a low-crystalline ethylene copolymer can be efficiently prepared.

Though the polyolefin obtained using the above-mentioned highly active catalyst is excellent in physical properties, there has been further desired the advent of such a process as capable of preparing polyolefin (e.g., low-crystalline ethylene copolymer) showing much more improved physical properties, for example, higher transparency and smaller change of heat-sealing strength with time.

In the light of the prior art as mentioned above, the present inventors have earnestly studied on the process for preparing polyolefin by polymerizing or copolymerizing olefin in a liquid phase, and as a result, they have found that the drying step can be simplified and polyolefin having no odor of a solvent for polymerization can be easily obtained by feeding a specific catalyst for olefin polymerization to the polymerization system in a specific manner and polymerizing or copolymerizing olefin in the presence of the specific catalyst.

The present inventors have also found that polyolefin which is excellent in various physical properties can be efficiently prepared through simplified steps by a process comprising polymerizing or copolymerizing olefin in a liquid phase in the presence of the above-mentioned specific catalyst for olefin polymerization to prepare a polymer solution, then separating the polymer solution into a lower phase portion and an upper phase portion in a separation zone kept at a temperature of not lower than the upper cloud point of the polymer solution, and recovering the resulting polyolefin from the lower phase portion while recycling at least a part of the upper phase portion to a polymerization zone. Thus, the present invention has been accomplished.

OBJECT OF THE INVENTION

It is an object of the present invention to provide a process for the preparation of polyolefin comprising polymerizing or copolymerizing olefin in a liquid phase, in which a drying step can be simplified and polyolefin having no odor of a diluent for polymerization can be easily prepared.

It is another object of the present invention to provide a process for the preparation of polyolefin in which polyolefin having excellent physical properties such as high transparency and a small change of heat-sealing strength with time can be efficiently prepared through simplified steps and moreover the resulting polyolefin is free from odor of a diluent for polymerization.

SUMMARY OF THE INVENTION

A first process for the preparation of polyolefin according to the present invention is a process comprising polymerizing or copolymerizing olefin in the presence of a catalyst for olefin polymerization comprising

[A] a metallocene compound of a transition metal selected from Group IVB of the periodic table, and

[B] an organoaluminum oxy-compound; wherein the organoaluminum oxy-compound [B] is added to the polymerization system in the form of a slurry of said organoaluminum oxy-compound [B] in aliphatic hydrocarbon or alicyclic hydrocarbon, and the polymerization is carried out in the presence of an aliphatic hydrocarbon diluent or an alicyclic hydrocarbon diluent.

A second process for the preparation of polyolefin according to the present invention is a process comprising:

(i) polymerizing or copolymerizing olefin in a liquid phase in the presence of a catalyst for olefin polymerization comprising

[A] a metallocene compound of a transition metal selected from Group IVB of the periodic table, and

[B] an organoaluminum oxy-compound; and (ii) feeding the resulting polymer solution containing the resulting polyolefin from a polymerization zone to a separation zone kept at a temperature of not lower than the upper cloud point of the polymer solution to separate the polymer solution into a lower phase portion containing the polyolefin in a high concentration and an upper phase portion, so as to recover the polyolefin from the lower phase portion in the separation zone and to recycle at least a part of the upper phase portion to the polymerization zone.

In the second process for the preparation of polyolefin according to the invention, aliphatic hydrocarbon or alicyclic hydrocarbon is preferably used as a diluent for polymerization, and the organoaluminum oxy-compound [B] is added to the polymerization zone preferably in the form of a slurry of said organoaluminum oxy-compound [B] in aliphatic hydrocarbon or alicyclic hydrocarbon.

In each of the first and second processes for the preparation of polyolefin according to the invention, the organoaluminum oxy-compound [B] preferably has a specific surface area of more than 10 $m^2/g$.

The catalyst for olefin polymerization may be formed from the metallocene compound [A], the organoaluminum oxy-compound [B] and an organoaluminum compound [C].

DETAILED DESCRIPTION OF THE INVENTION

The process for the preparation of polyolefin according to the present invention is described hereinafter in detail.

In the first process for the preparation of polyolefin according to the invention, when polyolefin is prepared by polymerizing or copolymerizing olefin in the presence of a catalyst for olefin polymerization comprising

[A] a metallocene compound of a transition metal selected from Group IVB of the periodic table, and

[B] an organoaluminum oxy-compound; the organoaluminum oxy-compound [B] is added to the polymerization system in the form of a slurry of said organoaluminum oxy-compound [B] in aliphatic hydrocarbon or alicyclic hydrocarbon, and the polymerization is carried out in the presence of an aliphatic hydrocarbon diluent or an alicyclic hydrocarbon diluent.

In the second process for the preparation of polyolefin according to the invention, (i) olefin is polymerized or copolymerized in a liquid phase in the presence of a catalyst for olefin polymerization comprising [A] a metallocene compound of a transition metal selected from Group IVB of the periodic table and [B] an organoaluminum oxy-compound; and (ii) a polymer solution containing the resulting polyolefin is fed from a polymerization zone to a separation zone kept at a temperature of not lower than the upper cloud point of the polymer solution to separate the polymer solution into a lower phase portion containing the polyolefin in a high concentration and an upper phase portion, so as to recover the polyolefin from the lower phase portion in the separation zone and to recycle at least a part of the upper phase portion to the polymerization zone.

At first, a catalyst for olefin polymerization employable in the invention is described below.

Figure 1:
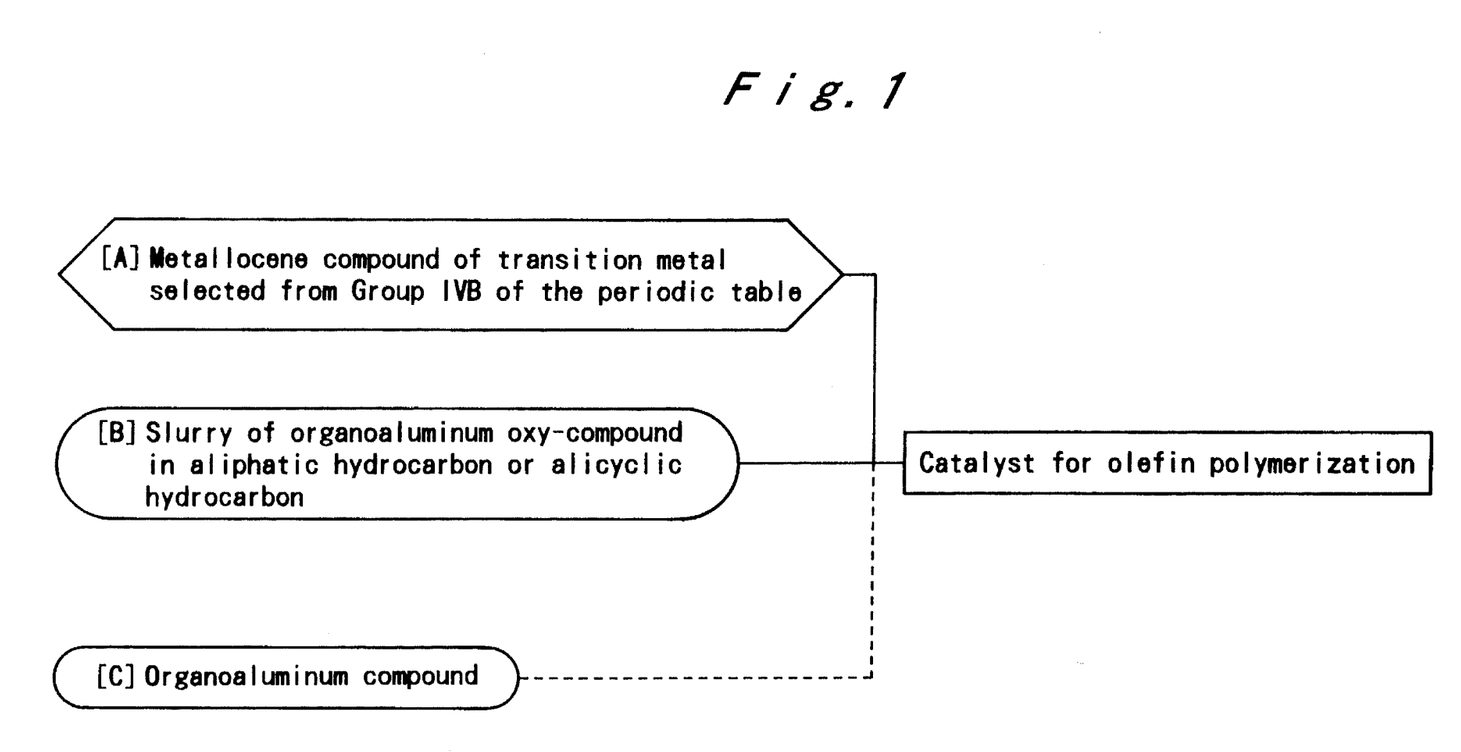
FIG. 1 illustrates steps for preparing a catalyst for olefin polymerization employable in the present invention.

FIG. 1 illustrates steps for preparing a catalyst for olefin polymerization employable in the first process for the preparation of polyolefin according to the invention.

The catalyst for olefin polymerization employable in the invention comprises:

[A] a metallocene compound of a transition metal selected from Group IVB of the periodic table, and

[B] an organoaluminum oxy-compound.

The metallocene compound [A] is a compound concretely represented by the formula $$ML_x$$

wherein M is a transition metal selected from the group consisting of Zr, Ti, Hf, V, Nb, Ta and Cr, L is a ligand coordinating to the transition metal, at least one of L is a ligand having a cyclopentadienyl skeleton, L other than the ligand having a cyclopentadienyl skeleton is a hydrocarbon group of 1–12 carbon atoms, an alkoxy group, an aryloxy group, trialkylsilyl group, $SO_3R$ (wherein R is a hydrocarbon group of 1 to 8 carbon atoms which may have a substituent such as halogen), halogen atom or hydrogen atom, and x is a valence of the transition metal.

The ligands having a cyclopentadienyl skeleton include, for example, cyclopentadienyl, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl, and an indenyl group, 4,5,6,7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the compound represented by the above formula contains two or more ligands having a cyclopentadienyl skeleton, two ligands having a cyclopentadienyl skeleton may be bonded together via an alkylene group such as ethylene and propylene, a substituted alkylene group such as isopropylidene and diphenylmethylene, a silylene group or a substituted silylene group such as dimethylsilylene, diphenylsilylene and methylphenylsilylene.

Following ligands may be exemplified as the ligand other than those having a cyclopentadienyl skeleton.

The hydrocarbon group having 1–12 carbon atoms includes, for example, alkyl, cycloalkyl, aryl and aralkyl;

the alkyl group includes methyl, ethyl, propyl, isopropyl and butyl;

the cycloalkyl group includes, for example, cyclopentyl and cyclohexyl;

the aryl group includes, for example, phenyl and tolyl; and the aralkyl group includes, for example, benzyl and neophyl.

The alkoxy group includes, for example, methoxy, ethoxy and butoxy;

the aryloxy group includes, for example, phenoxy; and the hologen includes, for example, fluorine, chlorine, bromine and iodine.

The ligand represented by $SO_3R$ includes, for example, p-toluenesulfonate, methanesulfonate and trifluoromethanesulfonate.

When the transition metal has a valence of 4, the metallocene compound [A-3] containing ligands having a cyclopentadienyl skeleton may be represented more concretely by the formula $$R^2{}_kR^3{}_lR^4{}_mR^5{}_nM$$

wherein M is an above mentioned transition metal, $R^2$ is a group (ligand) having a cyclopentadienyl skeleton, $R^3$, $R^4$ and $R^5$ are each a group having a cyclopentadienyl skeleton, an alkyl group, cycloalkyl group, aryl group, aralkyl group, alkoxy group, aryloxy group, trialkylsilyl group, $SO_3R$ group, halogen atom or hydrogen atom, k is an integer of at least 1, and k+l+m+n=4.

In the transition metal compounds of the above-mentioned formula $R^2{}_kR^3{}_lR^4{}_mR^5{}_nM$, at least two of $R^2$, $R^3$, $R^4$ and $R^5$ preferablly have a cyclopentadienyl skeleton, that is, $R^2$ and $R^3$ are each a group having a cyclopentadienyl skeleton. These groups having a cyclopentadienyl skeleton may be bonded to each other via an alkylene group such as ethylene and propylene, a substituted alkylene group such as isopropylidene, diphenylmethylene, a silylene group or a substituted silylene group such as dimethylsilylene, diphenylsilylene and methylphenylsilylene. Also, $R^4$ and $R^5$ may be each a group having a cyclopentadienyl skeleton, an alkyl group, cycloalkyl group, aryl group, aralkyl group, alkoxy group, aryloxy group, trialkylsilyl group, $SO_3R$, halogen atom or hydrogen atom.

Listed below are typical representatives of the transition metal compounds in which M is zirconium.

Bis(indenyl)zirconium dichloride,

Bis(indenyl)zirconium dibromide,

Bis(indenyl)zirconium bis(p-toluenesulfonate),

Bis(4,5,6,7-tetrahydroindenyl)zirconium dichloride,

Bis(fluorenyl)zirconium dichloride,

Ethylenebis(indenyl)zirconium dichloride,

Ethylenebis(indenyl)zirconium dibromide,

Ethylenebis(indenyl)dimethyl zirconium,

Ethylenebis(indenyl)diphenyl zirconium,

Ethylenebis(indenyl)methyl zirconium monochloride,

Ethylenebis(indenyl)zirconium bis(mehtanesulfonate),

Ethylenebis(indenyl)zirconium bis(p-toluenesulfonate),

Ethylenebis(indenyl)zirconium bis(trifluoromethanesulfonate),

Ethylenebis(4,5,6,7-tetrahydroindenyl)zirconium dichloride,

Isopropylidene(cyclopentadienyl-fluorenyl)zirconium dichloride,

Isopropylidene(cyclopentadienylmethylcyclopentadienyl)zirconium dichloride,

Dimethylsilylenebis(cyclopentadienyl)zirconium dichloride,

Dimethylsilylenebis(methylcyclopentadienyl)zirconium dichloride,

Dimethylsilylenebis(dimethylcyclopentadienyl)zirconium dichloride,

Dimethylsilylenebis(trimethylcyclopentadienyl)zirconium dichloride,

Dimethylsilylenebis(indenyl)zirconium dichloride,

Dimethylsilylenebis(2-methylindenyl)zirconium dichloride,

Dimethylsilylenebis(2-methyl-4-isopropylindenyl)zirconium dichloride,

Dimethylsilylenebis(2,4,7-trimethylindenyl)zirconium dichloride,

Dimethylsilylenebis(indenyl)zirconium bis(trifluoromethanesulfonate),

Dimethylsilylenebis(4,5,6,7-tetrahydroindenyl)zirconium dichloride,

Dimethylsilylene(cyclopentadienyl-fluorenyl)zirconium dichloride,

Diphenylsilylenebis(indenyl)zirconium dichloride,
Diphenylsilylenebis(2-methyl-4-isopropylidenyl)zirconium dichloride,
Diphenylsilylenebis(2,4,7-trimethylindenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium monochloride monohydride,
Bis(cyclopentadienyl)methyl zirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxy chloride,
Bis(cyclopentadienyl)zirconium ethoxy chloride,
Bis(cyclopentadienyl)zirconium bis(methanesulfonate),
Bis(cyclopentadienyl)zirconium bis(p-toluenesulfonate),
Bis(cyctopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(mehtanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride In the above-mentioned metallocene compound, the di-substituted cyclopentadienyl groups include 1,2- and 1,3-substituted groups, and the tri-substituted cyclopentadienyl groups include 1,2,3- and 1,2,4- substituted groups. Also the alkyl groups such as propyl and butyl include n-, i-, sec- and tert- isomers.

There may also be used transition metal compounds wherein the zirconium metal in the above-exemplified zirconium compounds is replaced with titanium, hafnium, vanadium, niobium, tantalum or chromium.

These compounds may be used alone or in combination of two or more.

Further, those compounds may be used after diluted in hydrocarbon or halogenated hydrocarbon.

In the invention, a zirconocene compound having zirconium as its central metal atom and having a ligand containing at least two cyclopentadienyl skeletons is preferably used as the metallocene compound [A-3].

Such metallocene compound as mentioned above can be supported on a carrier by bringing it into contact with a particulate carrier compound.

Examples of the carrier compounds employable in the invention include inorganic carrier compounds such as $SiO_2$, $Al_2O_3$, $B_2O_3$, MgO, $ZrO_2$, CaO, $TiO_2$, ZnO, $SnO_2$, BaO and ThO; and resins such as polyethylene, polypropylene, poly-1-butene, poly-4-methyl-1-pentene and a styrene/divinylbenzene copolymer.

These carrier compounds may be used in combination of two or more kinds.

Next, the organoaluminum oxy-compound [B] used in the invention is described below.

The organoaluminum oxy-compound [B] used in the invention may be a known aluminoxane [B-1], or may be a benzene-insoluble organoaluminum oxy-compound [B-2].

The known aluminoxane [B-1] is concretely represented by the following formula (1) or (2).

(1)

(2)

In the formula (1) or (2), R is a hydrocarbon group, and m is an integer of not less than 2, preferably an integer of 5 to 40. Examples of the hydrocarbon group indicated by R include methyl group, ethyl group, propyl group and butyl group. Of these, preferred are methyl group and ethyl group, and particularly preferred is methyl group This aluminoxane may be formed from a mixture of alkyloxyaluminum unit represented by the formula $OAl(R^1)$ and alkyloxyaluminum unit represented by the formula $OAl(R^2)$. In the formulas $OAl(R^1)$ and $OAl(R^2)$, each of $R^1$ and $R^2$ is a hydrocarbon group, and examples of the hydrocarbon group are the same as those mentioned with respect to the above R, but $R^1$ and $R^2$ are different from each other.

The known aluminoxane [B-1] is prepared, for example, by any of the following processes, and the resulting aluminoxane is generally obtained in the form of a solution of said aluminoxane in aromatic hydrocarbon.

(1) a process comprising adding an organoaluminum compound such as trialkylaluminum to an aromatic hydrocarbon suspension of a compound containing adsorbed water, or a salt containing water of crystallization such as magnesium chloride hydrate, copper sulfate hydrate, aluminum sulfate hydrate, nickel sulfate hydrate or cerous chloride hydrate, to react them with each other, and obtaining aluminoxane in the form of a solution of said aluminoxane in aromatic hydrocarbon; and (2) a process comprising contacting water, ice or steam directly on an organoaluminum compound such as trialkylaluminum in a medium such as benzene, toluene, ethyl ether or tetrahydrofuran, and obtaining aluminoxane in the form of a solution of said aluminoxane in the medium.

Of these processes, the process (1) is preferably used.

Concrete examples of the organoaluminum compounds employable for preparing the solution of aluminoxane include:

trialkylaluminums such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these, trialkylaluminums are particularly preferred.

Also employable as the organoaluminum compound is isoprenylaluminum represented by the following formula [III]:

$$(i\text{-}C_4H_9)_xAl_y(C_5H_{10})_z \quad [\text{III}]$$

wherein each of x, y and z is a positive integer, and $z \geq 2x$.

The above-exemplified organoaluminum compounds may be used singly or in combination.

The benzene-insoluble organoaluminum oxy-compound [B-2] employable in the invention can be obtained, for example, by bringing a solution of aluminoxane into contact with water or an active hydrogen-containing compound or by bringing the above-mentioned organoaluminum compound into contact with water.

When the benzene-insoluble organoaluminum oxy-compound employable in the invention is analyzed by infrared spectrophotometry (IR), a ratio $(D_{1260}/D_{1220})$ of an absorbance $(D_{1260})$ at about $1260 \text{ cm}^{-1}$ to an absorbance $(D_{1220})$ at about $1220 \text{ cm}^{-1}$ is preferably not more than 0.09, more preferably not more than 0.08, particularly preferably in the range of 0.04 to 0.07.

The benzene-insoluble organoaluminum oxy-compound [B-2] as mentioned above is presumed to have an alkyloxyaluminum unit (i) represented by the following formula [IV]:

$$\begin{array}{c} R^7 \\ | \\ \{Al-O\} \end{array} \quad [\text{IV}]$$

wherein $R^7$ is a hydrocarbon group of 1 to 12 carbon atoms.

Concrete examples of the hydrocarbon group indicated by $R^7$ include methyl group, ethyl group, n-propyl group, isopropyl group, n-butyl group, isobutyl group, pentyl group, hexyl group, octyl group, decyl group, cyclohexyl group and cyclooctyl group. Of these, preferred are methyl group and ethyl group, and particularly preferred is methyl group.

In addition to the alkyloxyaluminum unit (i) represented by the above formula [IV], the benzene-insoluble organoaluminum oxy-compound [B-2] may contain an oxyaluminum unit (ii) represented by the following formula [V]:

$$\begin{array}{c} R^8 \\ | \\ \{Al-O\} \end{array} \quad [\text{V}]$$

wherein $R^8$ is a hydrocarbon group of 1 to 12 carbon atoms, an alkoxy group of 1 to 12 carbon atoms, an aryloxy group of 6 to 20 carbon atoms, a hydroxyl group, halogen or hydrogen.

The group indicated by $R^s$ in the above formula [V] is different from the group indicated by $R^7$ in the aforesaid formula [IV].

In the case where the organoaluminum oxy-compound contains the oxyaluminum unit (ii), it is desirable that the organoaluminum oxy-compound contains the alkyloxyaluminum unit (i) in an amount of not less than 30 by mol, preferably not less than 50% by mol, more preferably not less than 70% by mol.

The organoaluminum oxy-compound [B] as mentioned above is generally commercially available or handled as its toluene solution.

The organoaluminum oxy-compound [B] used in the invention may contain an organic compound component of other metals than aluminum in a small amount.

Further, the organoaluminum oxy-compound [B] may be used by supporting it on the above-mentioned carrier compound.

In the first process for the preparation of polyolefin according to the invention, the organoaluminum oxy-compound [B] is added to the polymerization system in the form of a slurry of said organoaluminum oxy-compound [B] in aliphatic or alicyclic hydrocarbon (b).

The aliphatic or alicyclic hydrocarbon (b) preferably has a boiling point of not higher than 100° C., more preferably not higher than 90° C., most preferably not higher than 75° C.

Concrete examples of the aliphatic or alicyclic hydrocarbon (b) include 2,2-dimethylpropane, 2-methylbutane, 2,2-dimethylbutane, 2,3-dimethylbutane, 2,2,3-trimethylbutane, n-pentane, 2-methylpentane, 3-methylpentane, 2,2-dimethylpentane, 3,3-dimethylpentane, 2,3-dimethylpentane, 2,4-dimethylpentane, n-hexane, 2-methylhexane, 3-methylhexane, n-heptane, octane, decane, cyclohexane, methylcyclopentane and dimethylcyclopentane. They may be used in combination.

The slurry of the organoaluminum oxy-compound [B] is appropriately prepared by dispersing the organoaluminum oxy-compound [B] in the aliphatic or alicyclic hydrocarbon (b), and is concretely prepared by any of the following processes.

(1) a process comprising distilling off toluene from a toluene solution of the organoaluminum oxy-compound [B], then mechanically pulverizing the resulting powdery organoaluminum oxy-compound [B], and suspending thus pulverized compound in the aliphatic or alicyclic hydrocarbon (b);

(2) a process comprising distilling off toluene from a toluene solution of the organoaluminum oxy-compound [B], then adding the aliphatic or alicyclic hydrocarbon (b) to the resulting powdery organoaluminum oxy-compound [B], and mechanically pulverizing the resulting mixture; and (3) a process comprising bringing a toluene solution of the organoaluminum oxy-compound [B] into contact with the aliphatic or alicyclic hydrocarbon (b) to sediment the organoaluminum oxy-compound [B], and then conducting diluent exchange.

The toluene solution of the organoaluminum oxy-compound [B] used for those processes has a concentration of generally 0.1 to 10 g·atom/l, preferably 0.5 to 7 g·atom/l, more preferably 0.5 to 5 g·atom/l, in terms of aluminum atom.

In the contact between the toluene solution of the organoaluminum oxy-compound [B] and the aliphatic or alicyclic hydrocarbon (b), the aliphatic or alicyclic hydrocarbon (b) is used in a ratio by volume thereof to the toluene solution of the organoaluminum oxy-compound [B] within the range of 0.3 to 10, preferably 0.5 to 5.

In the above processes, a toluene solution of the organoaluminum oxy-compound [B] is used as illustrated above, but a benzene solution of the organoaluminum oxy-compound [B] may be used instead of the toluene solution of the organoaluminum oxy-compound [B].

In the present invention, the organoaluminum oxy-compound [B] of solid form contained in the slurry prepared as above preferably has a specific surface area of not less than 10 m²/g, more preferably not less than 100 m²/g.

By adding the organoaluminum oxy-compound [B] to the polymerization system in the form of a slurry of said organoaluminum oxy-compound [B] in the aliphatic or alicyclic hydrocarbon (b) as described above, olefin can be polymerized or copolymerized with high polymerization activities.

The specific surface area of the solid organoaluminum oxy-compound [B] can be measured in the invention using MONOSORB-MS-12 (available from GUANTACHROME) in accordance with a known BET method. In the measurement of the specific surface area, an organoaluminum oxy-compound [B] having been dried under a reduced pressure and recovered in a nitrogen atmosphere is desirably employed.

The catalyst for olefin polymerization employable in the invention is formed from the metallocene compound [A] and the organoaluminum compound [B] as described above, but in addition thereto, the catalyst may contain if necessary an organoaluminum compound [C]. As the organoaluminum compound [C], there can be mentioned, for example, an organoaluminum compound represented by the following formula [VI].

$$R^a{}_n AlX_{3-n} \qquad [VI]$$

wherein $R^a$ is hydrocarbon of 1–12 carbon atoms, X is halogen or hydrogen, and n is 1–3.

In the above-mentioned formula, $R^a$ is hydrocarbon group of 1–12 carbon atoms, such as, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylalulminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds [B-1], there may also be used a compound represented by the following formula:

$$R^a{}_n AlY_{3-n} \qquad [VII]$$

wherein $R^a$ is as defined above, Y is $-OR^b$, $-OSiR^c{}_3$, $-OAlR^d{}_2$, $-NR^e{}_2$, $-SiR^f{}_3$, or $-N(R^g)AlR^h{}_2$, n is 1–2 and $R^b$, $R^c$, $R^d$ and $R^h$ are each methyl, ethyl, isopropyl, isobutyl, cyclohexyl, phenyl, etc; $R^e$ is hydrogen, methyl, ethyl, isopropyl, phenyl, trimethylsilyl, etc; and $R^f$ and $R^g$ are each methyl, ethyl, etc.

The organoaluminum compounds [B-1] include, in concrete, such compounds as mentioned below.

(i) Compounds of the formula $R^a{}_n Al(OR^b)_{3-n}$ such as dimethylaluminum methoxide, diethylaluminum ethoxide, diisobutylaluminum methoxide, etc;

(ii) Compounds of the formula $R^a{}_n Al(OSiR^c{}_3)_{3-n}$ such as $Et_2Al(OSiMe_3)$, $(iso\text{-}Bu)_2Al(OSiMe_3)$, $(iso\text{-}Bu)_2Al(OSiEt_3)$, etc;

(iii) Compounds of the formula $R^a{}_n Al(OAlR^d{}_2)_{3-n}$ such as $Et_2AlOAlEt_2$, $(iso\text{-}Bu)_2AlOAl(iso\text{-}Bu)_2$, etc;

(iv) Compounds of the formula $R^a{}_n Al(NR^e{}_2)_{3-n}$ such as $Me_2AlNEt_2$, $Et_2AlNHMe$, $Me_2AlNHEt$; $Et_2AlN(Me_3Si)_2$, $(iso\text{-}Bu)_2AlN(Me_3Si)_2$, etc;

(v) Compounds of the formula $R^a{}_n Al(SiR^f{}_3)_{3-n}$ such as $(iso\text{-}Bu)_2AlSiMe_3$, etc; and (vi) Compounds of the formula $R^a{}_n Al[N(R^g)\text{-}AlR^h{}_2]_{3-n}$ such as $Et_2AlN(Me)\text{-}AlEt_2$, $(iso\text{-}Bu)_2AlN(Et)Al(iso\text{-}Bu)_2$, etc.

In this invention, trialkylaluminum is preferable in the organoaluminum compounds [C] mentioned above; triisobutylaluminum is particularly preferable. These organoaluminum compounds [C] may be also used in combination of two or more.

The catalyst for olefin polymerization employable in the invention is formed from the catalyst components [A] and [B] and if necessary the catalyst component [C]. By the use of such a catalyst as mentioned above, olefin can be polymerized or copolymerized with high polymerization activities, and polyolefin which is excellent in composition distribution of each components can be obtained.

In the polymerization, the metallocene compound [A] is used in an amount, in terms of transition metal atom, of generally about 0.00005 to 0.1 mmol, preferably about 0.0001 to 0.05 mmol, based on 1 liter of the polymerization volume. The organoaluminum oxy-compound [B] is used in such an amount that the aluminum atom contained in the organoaluminum oxy-compound [B] would be generally in the range of about 1 to 10,000 mol, preferably 10 to 5,000 mol, based on 1 mol of the transition metal atom contained in the metallocene compound [A]. In the case of adding the organoaluminum compound [C], the organoaluminum compound [C] is used generally in an amount of about 0 to 200 mol, preferably about 0 to 100 mol, based on 1 mol of the aluminum atom contained in the organoaluminum oxy-compound [B].

In the present invention, olefin is polymerized or copolymerized in the presence of the above-mentioned catalyst for olefin polymerization. The olefin includes α-olefin having 2 to 20 carbon atoms and if necessary non-conjugated diene.

Concrete examples of the α-olefins having 2 to 20 carbon atoms employable in the invention include ethylene, propylene, 1-butene, 1-pentene, 1-hexene, 4-methyl-1-pentene, 1-octene, 1-decene and 1-dodecene.

Concrete examples of the non-conjugated dienes employable in the invention include cyclic dienes such as 5-ethylidene-2-norbornene, 5-propylidene-5-norbornene, dicyclopentadiene and 5-vinyl-2-norbornene; and chain no-conjugated dienes such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene.

In the first process for the preparation of polyolefin according to the invention, aliphatic hydrocarbon or alicyclic hydrocarbon is used as a diluent for polymerization.

The aliphatic hydrocarbon or the alicyclic hydrocarbon used in the invention preferably is an aliphatic hydrocarbon having a boiling point of not higher than 100° C. or an alicyclic hydrocarbon having a boiling point of not higher than 100° C., and is particularly preferably the same as the aliphatic or alicyclic hydrocarbon (b) which is used for preparing a slurry of the organoaluminum oxy-compound [B] mentioned before in detail. The aliphatic hydrocarbon or the alicyclic hydrocarbon may be used in combination of two or more kinds. Of these hydrocarbons, preferably used are hexane, methylpentane and methylcyclopentane.

The aliphatic or alicyclic hydrocarbon (b) easily evaporates, and therefore if this hydrocarbon is used as a solvent for polymerization, a drying step of the resulting polymer can be simplified and any odor of the solvent does not remain in the polymer finally obtained.

When olefin is polymerized in a liquid phase in the present invention, the polymerization temperature is generally in the range of $-20°$ to 200° C., preferably 0° to 150° C., more preferably 20° to 120° C., and the polymerization pressure is generally in the range of an atmospheric pressure to 100 kg/cm$^2$ preferably an atmospheric pressure to 50 kg/cm$^2$ more preferably an atmospheric pressure to 30 kg/cm$^2$.

A molecular weight of the resulting polyolefin may be regulated by varying the polymerization conditions such as a polymerization temperature, or may be regulated by controlling the amount of hydrogen (molecular weight regulator) used.

The above-mentioned polymerization is carried out in a liquid phase, that is, the polymerization is-carried out by a liquid phase polymerization such as a solution polymerization or a suspension polymerization. In the invention, the solution polymerization is preferred.

Further, the polymerization can be carried out either batchwise, semi-continuously or continuously, but it is preferred to carry out the polymerization continuously. Furthermore, the polymerization may be carried out in two or more steps having reaction conditions different from each other.

In the first process for the preparation of polyolefin according to the invention, it is preferred that the polymer obtained immediately after the above-mentioned polymerization can be separated and recovered from the polymer solution by a conventional method. In the solution polymerization, it is preferred to use a method of directly evaporating the solvent from the polymer solution to dry the polymer or a method of phase-separating the polymer solution and then evaporating the solvent from the concentrated phase to dry the polymer.

The polyolefin obtained by the first process of the invention preferably is a homopolymer of α-olefin, an α-olefin copolymer or a copolymer of α-olefin and nonconjugated diene.

The polyolefin obtained by the invention preferably is a copolymer of ethylene and α-olefin and if necessary non-conjugated diene, and the polyolefin particularly preferably is a low-crystalline polyolefin containing constituent units derived from ethylene in an amount of 30 to 95% by mol, preferably 45 to 93% by mol, constituent units derived from α-olefin in an amount of 5 to 70% by mol, preferably 7 to 60% by mol, and constituent units derived from non-conjugated diene in an amount of 0 to 10% by mol.

Such a polyolefin as described above generally has an intrinsic viscosity, as measured in decahydronaphthalene (decaline) at 135° C., of generally 0.5 to 20 dl/g, preferably 0.7 to 10 dl/g, more preferably 1.0 to 5.0 dl/g.

According to the first process for the preparation of polyolefin, aliphatic hydrocarbon or alicyclic hydrocarbon is used as a diluent for polymerization, so that the drying step can be simplified and polyolefin having no odor of a diluent (solvent) for polymerization can be easily obtained.

The polyolefin (copolymer) obtained by the invention using the aforesaid catalyst for olefin polymerization is excellent in the composition distribution of each components.

Next, the second process for the preparation of polyolefin according to the present invention is described below.

In the second process for the preparation of polyolefin,
(i) olefin is polymerized or copolymerized in a liquid phase in the presence of a catalyst for olefin polymerization comprising
 [A] a metallocene compound of a transition metal selected from Group IVB of the periodic table, and
 [B] an organoaluminum oxy-compound; and
(ii) a polymer solution containing the resulting polyolefin is fed from a polymerization zone to a separation zone kept at a temperature of not lower than the upper cloud point of the polymer solution to separate the polymer solution into a lower phase portion containing the polyolefin in a high concentration and an upper phase portion, so as to recover the polyolefin from the lower phase portion in the separation zone and to recycle at least a part of the upper phase portion to the polymerization zone.

The catalyst for olefin polymerization used in the second process for the preparation of polyolefin is the same catalyst for olefin polymerization as used in the first process for the preparation of polyolefin.

Also in this second process for the preparation of polyolefin, the organoaluminum oxy-compound [B] is added to the polymerization zone in the form of a slurry of said organoaluminum oxy-compound [B] in the aliphatic or alicyclic hydrocarbon (b), similarly to the first process for the preparation of polyolefin.

As the olefin to be polymerized in this second process, the same olefin as described before can be employed.

In the second process for the preparation of polyolefin, the polymerization of olefin is carried out in a liquid phase as described above. As a diluent for polymerization, inert hydrocarbon or a reactive monomer itself is used, and preferably aliphatic hydrocarbon or alicyclic hydrocarbon is used. This aliphatic hydrocarbon or alicyclic hydrocarbon preferably has a boiling point of not higher than 100° C., and particularly preferably is the same as the aforesaid aliphatic or alicyclic hydrocarbon (b). The aliphatic hydrocarbon or the alicyclic hydrocarbon may be used in combination of two or more kinds. Among the hydrocarbons, particularly preferred are hexane, methylpentane and methylcyclopentane.

The aliphatic or alicycliC hydrocarbon (b) easily evaporates, and therefore if this hydrocarbon is used as a diluent for polymerization, a drying step of the resulting polymer can be simplified and any odor of the diluent does not remain in the polymer finally obtained.

The polymerization is preferably carried out under compulsively stirring by means of a stirrer or the like.

In the second process for the preparation of polyolefin according to the invention, the polymerization is preferably carried out under such conditions that the resulting polymer is dissolved in the diluent (solvent) for polymerization to form a substantially homogeneous phase, that is, the polymerization is preferably carried out at a temperature between the upper cloud point and the lower cloud point of the polymer solution. However, the polymerization may be carried out in a state where the both phases of the polymer solution separated under the two-phase separation conditions at a temperature not lower than the upper cloud point are dispersed and mixed with each other by stirring.

Concretely, the polymerization is carried out at the same temperature and the same pressure as those in the first process for the preparation of polyolefin.

Further, the polymerization is desirably carried out maintaining a polymer concentration in the polymer solution of generally 30 to 200 g/l, preferably 50 to 150 g/l. When the polymerization is carried out in such a concentration as mentioned above, the polymerization reaction proceeds smoothly and polyolefin can be efficiently obtained.

A molecular weight of the resulting polyolefin may be regulated by varying the polymerization conditions such as a polymerization temperature, or may be regulated by controlling the amount of hydrogen (molecular weight regulator) used.

The above-mentioned polymerization ms carried out in a liquid phase, that is, the polymerization is carried out by a liquid phase polymerization such as a solution polymerization or a suspension polymerization. In the invention, the solution polymerization is preferred.

Further, the polymerization can be carried out either batchwise, semi-continuously or continuously, but it is preferred to carry out the polymerization continuously. Furthermore, the polymerization may be carried out in two or more steps having reaction conditions different from each other.

In the second process for the preparation of polyolefin, the polymerization is carried out using the aforementioned catalyst for olefin polymerization, and the yield of copolymer is high for the amount of the catalyst. Therefore, the resulting polymer solution can be fed to the separation zone without subjecting it to a catalyst-removing treatment.

According to the second process for the preparation of polyolefin, the polymer solution obtained by the above-mentioned polymerization is fed from the polymerization zone to the separation zone which is kept at a temperature of not lower than the upper cloud point, and in the separation zone the polymer solution is separated into a lower phase portion containing polyolefin in a high concentration (also referred to as "concentrated phase" hereinafter) and an upper phase portion containing polyolefin in a low concentration (also referred to as "dilute phase" hereinafter).

When the temperature of the polymer solution in the separation zone is lower than the phase separation temperature, it is preferred to heat the polymer solution to a temperature of not lower than the phase separation temperature using a heat exchanger such as a multi-tube type heat exchanger or a double-tube type heat exchanger and then feed the polymer solution to the separation zone.

The upper cloud point of the polymer solution can be easily determined by measuring the transmitted light of the polymer solution and taking a temperature at which the intensity of the transmitted light is abruptly declined as the upper cloud point.

Conditions of the two-phase separation are depending on the temperature, natures of the monomer used and the resulting polymer (molecular weight, molecular weight distribution, composition, composition distribution, etc.), amount (concentration), kind of the solvent, pressure for the phase separation, and other conditions.

The resulting polymer solution is a homogeneous liquid phase when held at a temperature between the lower cloud point and the upper cloud point, but is separated into a concentrated phase and a dilute phase when held at a temperature of not lower than the upper cloud point. In general, there is a tendency that the temperature of the polymer solution, which is not lower than the upper cloud point, becomes higher, the copolymer concentration in the concentrated phase becomes higher, and in contrast thereto the copolymer concentration in the dilute phase becomes lower. Further, as a difference in the concentration between those two phases becomes larger, the phase separation is made more efficiently, and hence a post-treatment of the separated each phases can be easily carried out.

The temperature of the separation zone for separating the polymer solution is not lower than the upper cloud point of the polymer solution as described above. However, if the temperature of the separation zone is too high, not only the heat energy is largely consumed to give a disadvantage, but also polymers will be produced under different conditions from those in the polymerization zone thereby to affect the quality of polyolefin finally obtained. Accordingly, the temperature of the separation zone is usually in the range of from the upper cloud point of the polymer solution to a temperature higher than the upper cloud point by about 180° C., preferably in the range of from a temperature higher than the upper cloud point by about 10° C. to a temperature higher than the upper cloud point by about 150° C.

For lowering the the phase separation temperature, low-molecular weight hydrocarbon such as ethylene may be newly added to the separation zone.

The phase separation of the polymer solution is not necessarily conducted completely, and for example, a part of the dilute phase may be mixed with the concentrated phase.

The phase separation of the polymer solution can be easily carried out by means of gravity sedimentation, for example, by allowing the polymer solution to stand, or may be carried out by means of centrifugal separation.

The phase separation utilizing the gravity sedimentation is conducted for usually 5 to 120 minutes, preferably 5 to 40 minutes, and the time required for the separation can be shortened by setting the separation temperature higher.

The phase separation utilizing the centrifugal separation is generally conducted using a cyclone for liquid which is kept under the phase separation conditions, and by this centrifugal separation the dilute phase and the concentrated phase can be smoothly and stably recovered.

Thus, the polymer solution is phase-separated. The concentrated phase separated in the separation zone is then fed to a drying stage, wherein the concentrated phase is heated, flash-dried or sucked under a reduced pressure by means of a multi-tube type heat exchanger, a hopper or a rotary type solvent-removing device such as a thin film evaporator to remove the solvent and the unreacted monomer, whereby polyolefin is recovered. The concentrated phase contains the resulting polymer in a high concentration, and therefore the drying step can be simplified and the drying time can be shortened. Especially when the aliphatic or alicyclic hydrocarbon (b) having a boiling point of not higher than 100° C. is used as a solvent for polymerization, the drying time can be shortened and the drying step can be simplified as compared with the case of using a solvent for polymerization having a high boiling point such as toluene, and further polyolefin free from odor of the solvent for polymerization can be easily obtained, similarly to the first process for the preparation of polyolefin.

On the other hand, the dilute phase separated in the separation zone is partially or wholly recycled to the polymerization system. It is desirable that the dilute phase in an amount of usually not smaller than 10%, preferably not smaller than 50%, more preferably not smaller than 70%, is recycled to the polymerization system for the repeated use.

By recycling the dilute phase to the polymerization system as described above, not only the diluent (solvent) for polymerization can be repeatedly used, but also the copolymer, the unreacted monomer and the catalyst component such as the organoaluminum oxy-compound [B], all contained in the dilute phase, can be repeatedly used.

In the second process for the preparation of polyolefin according to the invention, the polymer solution is fed to the separation zone without subjecting it to a catalyst-removing treatment or the like as described above, and hence the dilute phase can be recycled directly to the polymerization zone for the repeated use even if this phase is not subjected to a purifying treatment or the like.

Further, a part of or all of the dilute phase which is not recycled to the polymerization zone is mixed with the polymer solution drawn from the polymerizer, if necessary heated, and then the resulting mixture was recycled to the separation zone. Otherwise, if necessary, the solvent and the unreacted monomer are recovered from the dilute phase, the resulting low-molecular weight polymer is removed therefrom, and the solvent and unreacted monomer thus recovered are repeatedly used for the polymerization reaction. By recycling thus recovered dilute phase to the separation zone, heat energy can be efficiently utilized. Moreover, the dilute phase to be recycled is so dilute that choking of tubes in the device used hardly takes place.

The temperature and the amount of the dilute phase to be recycled to the separation zone can be easily determined based on the phase separation temperature, the temperature of the polymer solution, the discharged amount, etc.

The polyolefin obtained as above by the second process of the invention preferably is a homopolymer of α-olefin, an α-olefin copolymer or a copolymer of α-olefin and non-conjugated diene.

The polyolefin obtained by the invention preferably is a copolymer of ethylene and α-olefin and if necessary non-conjugated diene, and the polyolefin particularly preferably is a low-crystalline polyolefin containing constituent units derived from ethylene in an amount of 30 to 95% by mol, preferably 45 to 93% by mol, constituent units derived from α-olefin in an amount of 5 to 70% by mol, preferably 7 to 60% by mol, and constituent units derived from non-conjugated diene in an amount of 0 to 10% by mol.

Such a polyolefin as described above generally has an intrinsic viscosity, as measured in decahydronaphthalene at 135° C. of 0.5 to 20 dl/g, preferably 0.7 to 10 dl/g, more preferably 1.0 to 5.0 dl/g.

According to the above-mentioned second process of the invention, polyolefin having excellent physical properties such as high transparency and a small change of heat-sealing strength with time can be efficiently prepared through simplified steps.

Further, the polyolefin obtained by the second process of the invention is narrower in the composition distribution as compared with polyolefin obtained by a conventional process in which a known titanium type catalyst is used and a solvent for polymerization is recycled. Furthermore, the polyolefin obtained by the second process is excellent in transparency and has a small change of heat-sealing properties with time.

EFFECT OF THE INVENTION

According to the process of the invention for preparing polyolefin, a drying step of the polyolefin obtained by liquid phase polymerization can be simplified and polyolefin having no odor of a dileunt (solvent) for polymerization can be easily prepared.

The polyolefin obtained by the process of the invention is excellent in the composition distribution of each components.

Further, according to the process of the invention, polyolefin having excellent physical properties such as high transparency and a small change of heat-sealing strength with time can be efficiently prepared through simplified steps.

The polyolefin obtained by the process of the invention is narrower in the composition distribution as compared with polyolefin obtained by a conventional process in which a known titanium type catalyst is used and a solvent for polymerization is recycled, and has excellent properties such as high transparency and a small change of heat-sealing properties with time.

EXAMPLE

The present invention is further illustrated below with reference to examples, but it should be construed that the present invention is in no way limited to those examples.

In the following examples, a mixture diluent (solvent) consisting of 60% by volume of hexane, 22% by volume of methylcyclopentane and 18% by volume of 3-methylpentane is referred to as "hexane".

The intrinsic viscosity [η] was measured in decahydronaphthalene at 135° C. and the polymer composition was measured by means of $^{13}$C-NMR in the following examples.

Example 1

[Preparation of a methylaluminoxane-hexane slurry (1)]

In a glass reactor equipped with a stirring blade was charged in a nitrogen atmosphere 1 liter of a toluene solution containing methylaluminoxane in an amount of 1.5 g·atom/liter in terms of aluminum atom, and to the toluene solution was dropwise added 1 liter of hexane having been substituted by nitrogen over 1 hour at room temperature under stirring. The resulting solid methylaluminoxane was filtered, washed with hexane, and dried under a reduced pressure. A part of the dried product was taken out for analysis, and the residue was suspended in hexane to prepare a hexane slurry of methylaluminoxane (1).

The methylaluminoxane obtained in the above had a specific surface area of 180 m$^2$/g.

[Batchwise copolymerization of ethylene and propylene under pressure]

Ethylene was copolymerized with propylene in a 2-liter autoclave (polymerizer) equipped with a stirring blade.

That is, from the top of the polymerizer (polymerization vessel), 0.9 liter of hexane having been dehydrated and purified, 0.1 liter of propylene, 0.09 ml of the hexane slurry of methylaluminoxane (1) (methylaluminoxane: 1.1 mg·atom/ml in terms of aluminum atom) obtained as above and 0.9 ml of a hexane solution of triisobutylaluminum (1 mmol/ml) were charged in the polymerizer. After a temperature of the reaction system was elevated to 70° C. ethylene was introduced into the polymerizer so that the total pressure was 7 kg/cm$^2$. In the polymerizer was further charged 0.29 ml of hexane solution of bis(1,3-dimethylcyclopentadienyl)zirconium dichloride (0.0034 mmole/ml) using a pressure-equalizing tube, to carry out a reaction for 1 hour while keeping the temperature at 80° C. and the total pressure at 8 kg/cm$^2$. After release of the pressure, a polymer solution was taken out of the polymerizer and dried.

The yield of the copolymer thus obtained was 56.7 g. This copolymer had an ethylene content of 86% by mol and an intrinsic viscosity [η] of 1.8 dl/g.

Example 2

[Preparation of a methylaluminoxane-hexane slurry (2)]

In a glass reactor equipped with a stirring blade was charged in a nitrogen atmosphere 1 liter of a toluene solution containing methylaluminoxane in an amount of 1.5 g·atom/liter in terms of aluminum atom, and then toluene was distilled off from the toluene solution. Thereafter, a part of the resulting product was taken out for analysis, and to the residue was added hexane to prepare a hexane slurry of methylaluminoxane (2).

The methylaluminoxane particles obtained in the above had a specific surface area of 25 $m^2/g$.

[Batchwise copolymerization of ethylene and propylene under pressure]

The procedure for the copolymerization of ethylene and propylene in Example 1 was repeated except for using the hexane slurry of methylaluminoxane (2) obtained as above to prepare a copolymer.

The yield of the copolymer thus obtained was 18.2 g. This copolymer had an ethylene content of 84% by mol and an intrinsic viscosity [η] of 1.7 dl/g.

Example 3

[Continuous copolymerization of ethylene and propylene under pressure]

Ethylene was continuously copolymerized with propylene in a 15-liter stainless steel polymerizer equipped with a stirring blade.

That is, from the top of the polymerizer, to the polymerizer were continuously fed hexane having been dehydrated and purified at a feed rate of 3.5 l/hr, a hexane solution of bis(1,3-dimethylcyclopentadienyl)zirconium dichloride (0.03 mmol/l) at a feed rate of 0.25 l/hr, a hexane solution of triisobutylaluminum (8 mmol/l) at a feed rate of 0.5 l/hr and the hexane slurry of methylaluminoxane (1) (methylaluminoxane: 1.33 mg. atom/l in terms of aluminum atom) at a feed rate of 0.75 l/hr.

Further, from the top of the polymerizer, to the polymerizer were continuously fed ethylene at a feed rate of 360 l/hr and propylene at a feed rate of 340 l/hr. The polymerization pressure was 7.9 $kg/cm^2$, and the residence time was about 1 hour.

Subsequently, a polymer solution was drawn out from the bottom of the polymerizer, and to the polymer solution was added a small amount of methanol to terminate the polymerization reaction. The polymer solution was subjected to a steam stripping treatment to separate the resulting copolymer from the solvent. Then, the copolymer was dried for 2 hours under the conditions of a temperature of 80° C. and a reduced pressure (100 mmHg).

The copolymer thus obtained had no odor of the solvent.

Through the above operation, an ethylene/propylene copolymer was obtained at a rate of 420 g/hr. This copolymer had an ethylene content of 80% by mol and an intrinsic viscosity [η] of 2.3 dl/g.

Comparative Example 1

The procedure for the copolymerization in Example 1 was repeated except for using a toluene solution of methylaluminoxane instead of the hexane slurry of methylaluminoxane (1), to prepare a copolymer. The copolymer thus obtained had odor of toluene even after dried for 24 hours under the conditions of a temperature of 80° C. and a reduced pressure (100 mmHg), and it was confirmed that the drying of the copolymer was insufficient.

Example 4

The procedures of Example 3 were repeated except for using bis(1,3-dimethylcyclopentadienyl)zirconium bistrifluoromethanesulfonyl instead of bis(1,3-dimethylcyclopentadienyl)zirconium dichloride and continuously feeding to the polymerizer ethylene at a feed rate of 320 l/hr and propylene at a feed rate of 390 l/hr so that the gas phase portion in the polymerizer had a hydrogen concentration of 0.07% by mol.

Through the above operation, an ethylene/propylene copolymer was obtained at a rate of 430 g/hr. This copolymer had an ethylene content of 78% by mol and an intrinsic viscosity [η] of 1.1 dl/g.

Example 5

[Batchwise copolymerization of ethylene, propylene and diene under pressure]

Ethylene was copolymerized with propylene and 7-methyl-1,6-octadiene in a 2-liter autoclave (polymerizer) equipped with a stirring blade.

That is, from the top of the polymerizer, 0.86 liter of hexane having been dehydrated and purified, 185 ml of propylene, 40 ml of 7-methyl-1,6-octadiene, 0.18 ml of the hexane slurry of methylaluminoxane (1) (methylaluminoxane: 1.1 mg·atom/ml in terms of aluminum atom) obtained in Example 1 and 0.8 ml of a hexane solution of triisobutylaluminum (1 mmol/ml) were charged in the polymerizer. After a temperature of the reaction system was elevated to 70° C. ethylene was introduced into the polymerizer so that the total pressure was 7 $kg/cm^2$. In the polymerizer was further charged 0.44 ml of a hexane solution of bis(1,3-dimethylcyclopentadienyl)zirconium dichloride (0.0034 mmole/ml) using a pressure-equalizing tube, to carry out a reaction for 1 hour while keeping the temperature at 60° C. and the total pressure at 8 $kg/cm^2$. After release of the pressure, a polymer solution was taken out of the polymerizer and dried.

The yield of the copolymer thus obtained was 72.8 g. This copolymer had an ethylene content of 78% by mol, an intrinsic viscosity [η] of 2.6 dl/g and an iodine value of 13.

Example 6

[Copolymerization of ethylene and 1-butene]

Ethylene was copolymerized with 1-butene in a 2-liter autoclave (polymerizer) equipped with a stirring blade.

That is, from the top of the polymerizer, 0.7 liter of hexane having been dehydrated and purified, 300 ml of 1-butene, 0.09 ml of the hexane slurry of methylaluminoxane (1) (methylaluminoxane: 1.1 mg·atom/ml in terms of aluminum atom) obtained in Example 1 and 0.9 ml of a hexene solution of triisobutylaluminum (1 mmol/ml) were charged in the polymerizer. After a temperature of the reaction system was elevated to 70° C. ethylene was introduced into the polymerizer so that the total pressure was 7 $kg/cm^2$. In the polymerizer was further charged 0.29 ml of a hexane solution of bis(1,3-dimethylcyclopentadienyl)zirconium dichloride (0.0034 mmole/ml) using a pressure-equalizing tube, to carry out a reaction for 1 hour while keeping the temperature at 90° C. and the total pressure at 8 $kg/cm^2$. After release of the pressure, a polymer solution was taken out of the polymerizer and dried.

The yield of the copolymer thus obtained was 54.1 g. This copolymer had an ethylene content of 91% by mol and an intrinsic viscosity [η] of 3.5 dl/g.

Example 7

[Batchwise copolymerization of ethylene and propylene under pressure]

Ethylene was copolymerized with propylene in a 2-liter autoclave (polymerizer) equipped with a stirring blade.

That is, from the top of the polymerizer, 0.8 liter of hexane having been dehydrated and purified and 0.9 ml of the hexane slurry of methylaluminoxane (1) (methylaluminoxane: 1.1 mg·atom/ml in terms of aluminum atom) were charged in the polymerizer. After a temperature of the reaction system was elevated to 80° C. propylene was introduced into the polymerizer so that the total pressure was 14.5 kg/cm$^2$ and then ethylene was further introduced into the polymerizer so that the total pressure was 15 kg/cm$^2$. In the polymerizer was then charged 3.4 ml of a hexane solution of bis(methylcyclopentadienyl)zirconium dichloride (0.0029 mmole/ml) using a pressure-equalizing tube, to carry out a reaction for 1 hour while keeping the temperature at 80° C. and the total pressure at 15 kg/cm$^2$. After release of the pressure, a polymer solution was taken out of the polymerizer and dried.

The yield of the copolymer thus obtained was 29.1 g. This copolymer had an ethylene content of 55% by mol and an intrinsic viscosity [η] of 0.18 dl/g.

Example 8

[Batchwise copolymerization of propylene and 1-butene under pressure]

Propylene was copolymerized with 1-butene in a 2-liter autoclave (polymerizer) equipped with a stirring blade.

That is, from the top of the polymerizer, 0.67 liter of hexane having been dehydrated and purified, 220 ml of 1-butene, 0.36 ml of the hexane slurry of methylaluminoxane (1) (methylaluminoxane: 1.1 mg·atom/ml in terms of aluminum atom) and 1 ml of a hexane solution of triisobutylaluminum (1 mg·atom/ml in terms of aluminum atom) were charged in the polymerizer. After a temperature of the reaction system was elevated to 70° C., propylene was introduced into the polymerizer so that the total pressure was 14 kg/cm$^2$. In the polymerizer was further charged 2 ml of a hexane solution of dimethylsilylene bis(2-methylindenyl)zirconium dichloride (0.0008 mmole/ml) using a pressure-equalizing tube, to carry out a reaction for 1 hour while keeping the temperature at 70° C. and the total pressure at 14 kg/cm$^2$. After release of the pressure, a polymer solution was taken out of the polymerizer, then hexane was removed from the polymer solution, and the polymer solution was dried.

The yield of the copolymer thus obtained was 81.1 g. This copolymer had a propylene content of 76% by mol and an intrinsic viscosity [η] of 1.3 dl/g.

Figure 2:
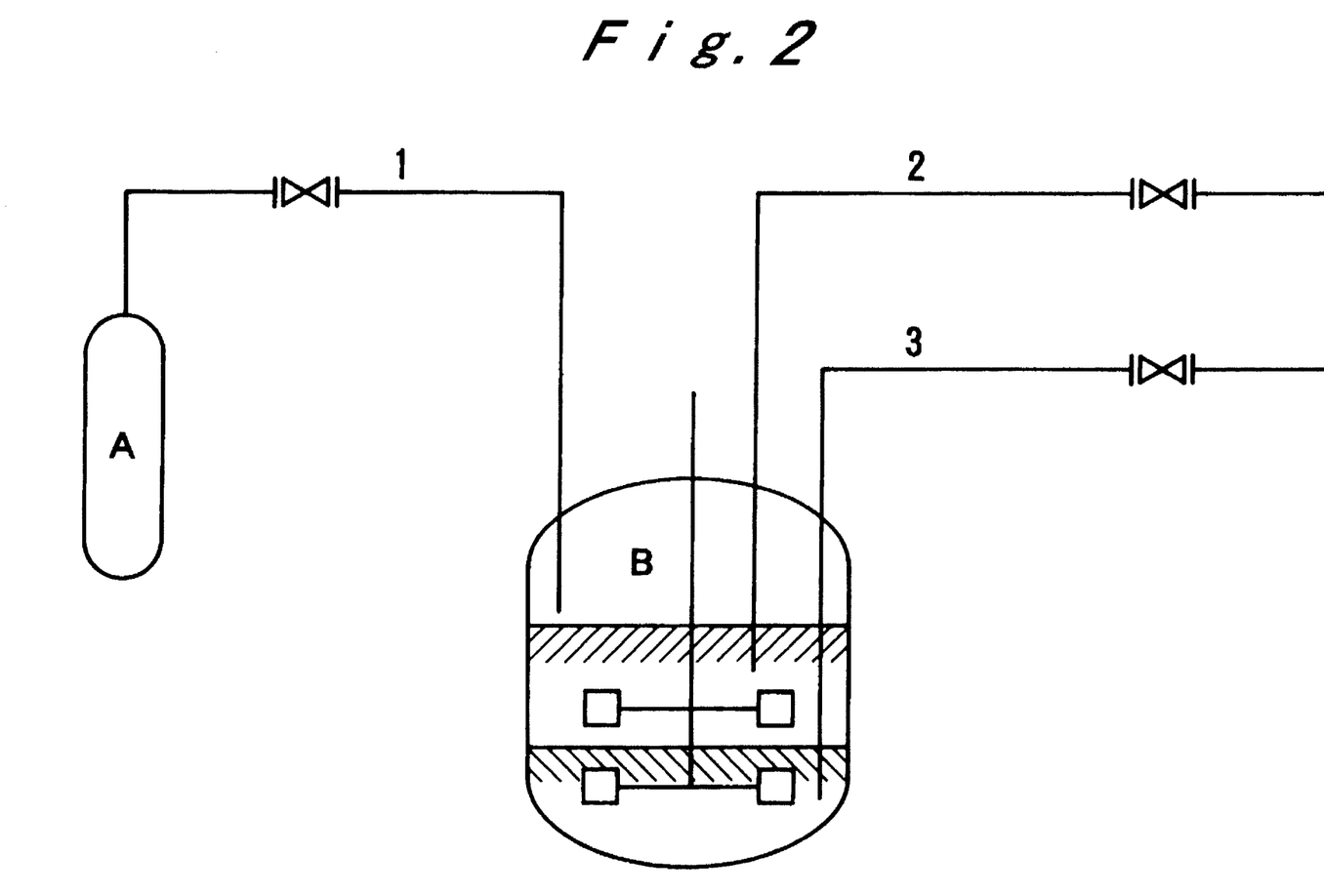
FIG. 2 shows a phase separation device.

In the following examples, the conditions for the phase separation of the polymer solution were examined on an experimental scale (batchwise system) in a manner described below, prior to the continuous polymerization test. The device used for the examination of the phase separation conditions is shown in FIG. 2.

Figure 3:
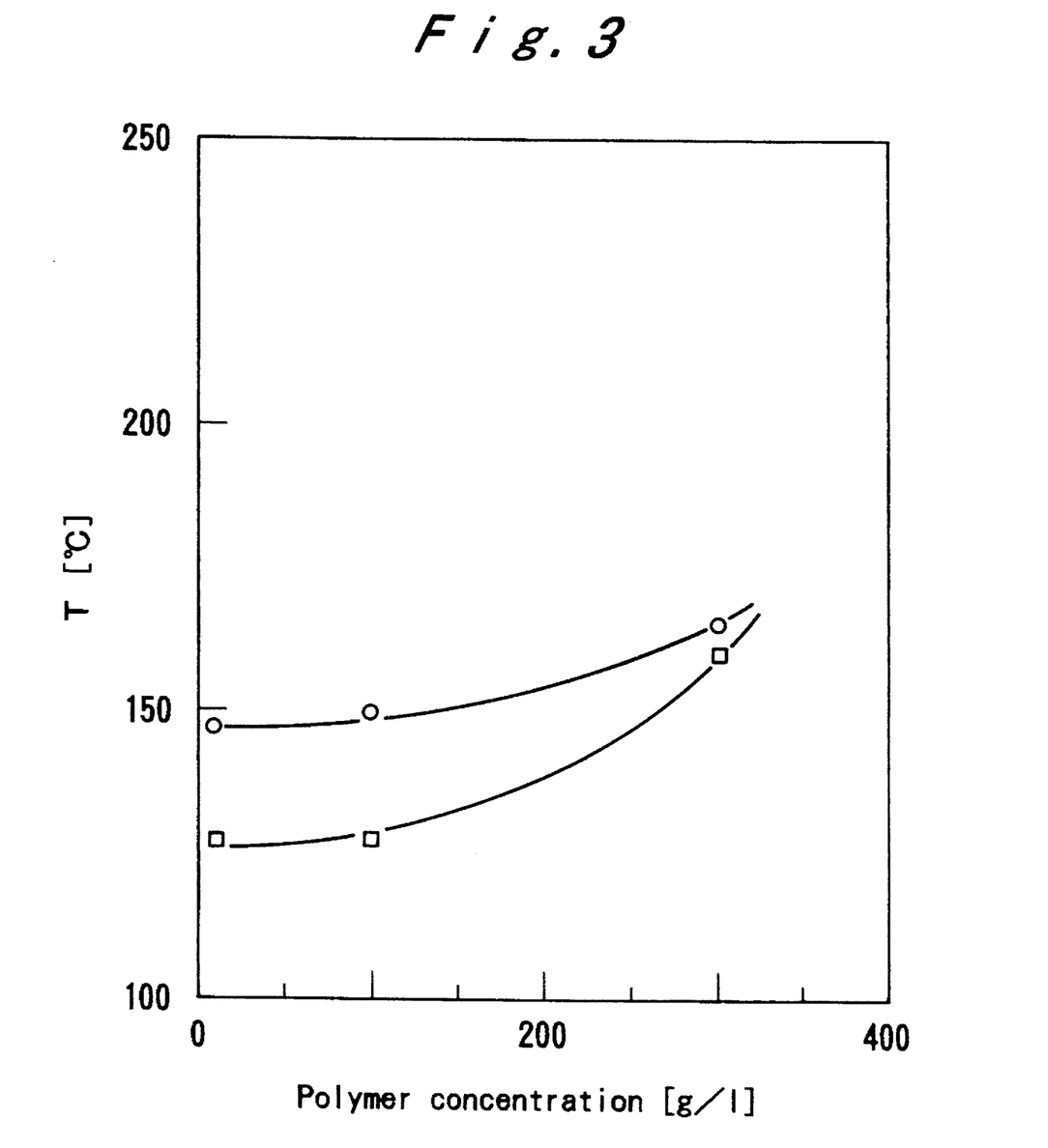
FIG. 3 shows a phase diagram drawn based on the measured cloud points.

That is, polyolefin (ethylene/propylene copolymer having an ethylene content of 81% by mol; intrinsic viscosity [η]: 1.2 dl/g) and hexane were charged in a container B, and a pre-determined amount of propylene was further charged in the container B from a container A through a tube 1. Thereafter, a temperature of the reaction system was elevated to set the reaction system under the phase separation conditions, and cloud points of the polymer solution were measured. From the cloud points thus measured, a phase diagram was drawn. The phase diagram is shown in FIG. 3, wherein symbols ○ indicate cloud points measured in a nitrogen atmosphere, and symbols □ indicate cloud points measured in propylene of 100 g/liter-solvent. At temperatures not lower than those cloud points, the phase separation of the polymer solution starts.

The polymer solution was allowed to stand to be separated into a dilute phase and a concentrated phase under the phase separation conditions presumed from the phase diagram. Thereafter, the dilute phase and the concentrated phase were taken out of the device through tubes 2 and 3, if necessary, and the concentration of the ethylene/propylene copolymer in each phase was measured.

Figure 4:
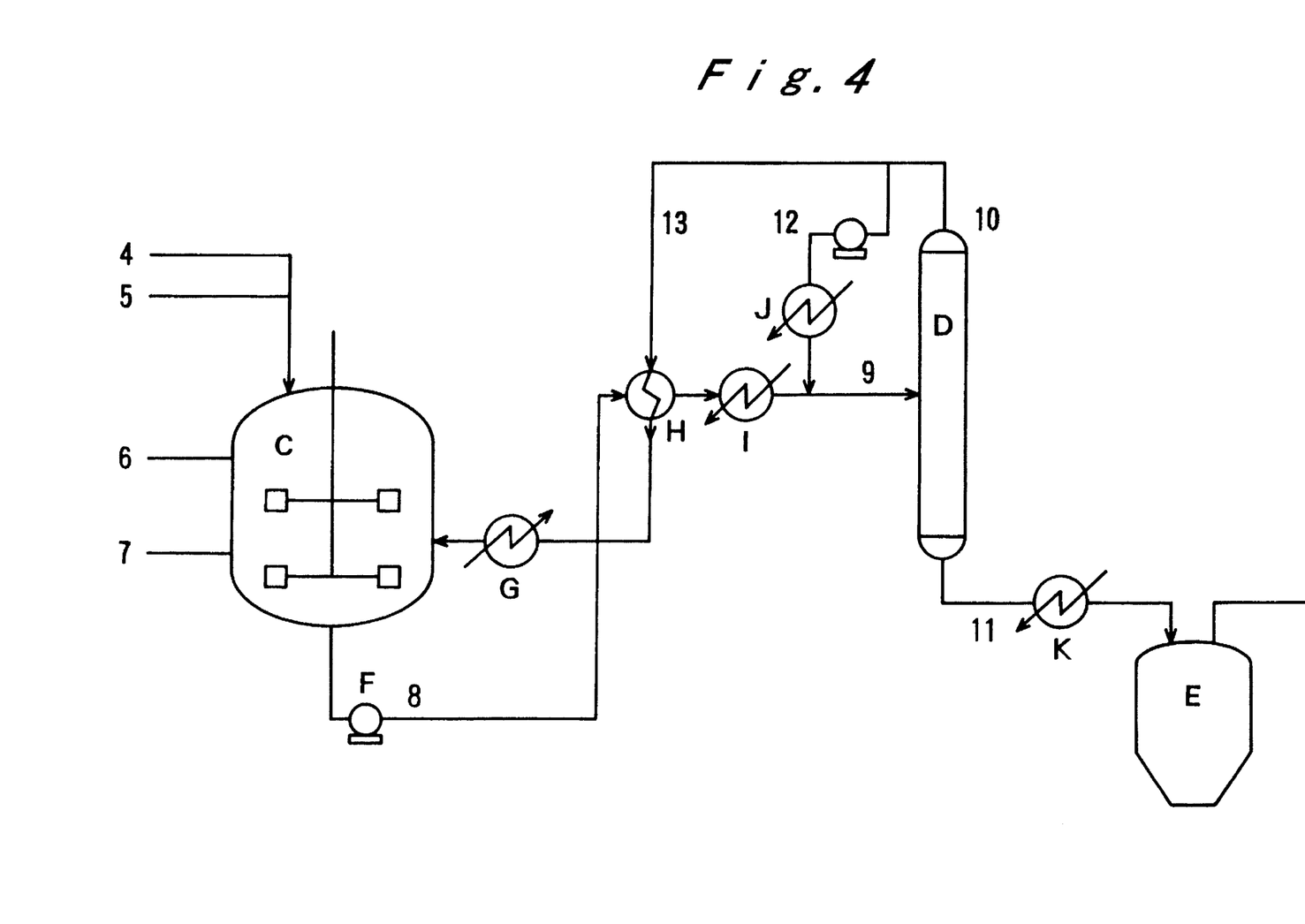
FIG. 4 is a flow chart illustrating the process for the preparation of polyolefin according to the present invention.

FIG. 4 is a flow chart illustrating the process for the preparation of polyolefin according to the invention.

Example 9

[Preparation of a methylaluminoxane-hexane slurry (3)]

In a SUS reactor equipped with a stirring blade was charged in a nitrogen atmosphere 10 liters of a toluene solution containing methylaluminoxane in an amount of 1.5 g·atom/liter in terms of aluminum atom, and to the toluene solution was dropwise added under stirring 1 liter of hexane having been substituted by nitrogen over 1 hour at room temperature. The resulting solid methylaluminoxane was filtered, and washed with hexane. A part of the resulting product was taken out for analysis and dried, and the residue was suspended in hexane to prepare a hexane slurry of methylaluminoxane (3).

The methylaluminoxane obtained in the above had a specific surface area of 185 m$^2$/g.

[Copolymerization of ethylene and 1-butene]

A test for the phase separation of a polymer solution was conducted using a continuous polymerization device shown in FIG. 4 in accordance with the aforementioned phase separation test.

That is, to a 300-liter continuous polymerization reactor C were continuously fed hexane having been dehydrated and purified at a feed rate of 38.7 l/hr through a tube 6, a hexane solution of tributylaluminum (2.5 mmol/l) at a feed rate of 4 l/hr through a tube 7, the hexane slurry of methylaluminoxane (3) (methylaluminoxane: 2.04 mg·atom/l in terms of aluminum atom) at a feed rate of 6.4 l/hr and a hexane solution of bis(1,3-dimethylcyclopentadienyl)zirconium dichloride (0.072 mmol/l) at a feed rate of 0.9 l/hr, the total amount of hexane fed to the reactor being 50 l/hr. At the same time, to the polymerization reactor C were continuously fed ethylene at a feed rate of 4.2 kg/hr, 1-butene at a feed rate of 15 kg/hr and hydrogen at a feed rate of 0.8 l/hr through tubes 4 and 5, to perform copolymerization under the conditions of a polymerization temperature of 90° C., a total pressure of 8.2 kg/cm$^2$·G and a residence time of 1.4 hours.

A solution of ethylene/1-butene copolymer produced in the polymerization reactor C was continuously discharged from the reactor through a tube 8 at a flow rate of 72 l/hr, then the temperature of the solution was elevated to 200° C. (thereby the pressure becoming to 40 kg/cm$^2$·G), and the solution was fed to a phase separator D.

In the phase separator D, the solution of ethylene/1-butene copolymer was separated into a concentrated phase (lower phase portion) containing most of the ethylene copolymer and a dilute phase (upper phase portion) containing a small amount of polymer. The concentrated phase was fed into a heat exchanger K at a rate of 13.1 l/hr through a tube 11, and was further fed into a hopper E, wherein the solvent was removed from the concentrated phase by evaporation, to obtain an ethylene/1-butene copolymer at a rate of 4.6 kg/hr.

The ethylene/1-butene copolymer thus obtained had an intrinsic viscosity $[\eta]$ of 1.51 dl/g and an ethylene content measured by means of $^{13}$C-NMR of 90% by mol.

On the other hand, the dilute phase separated in the phase separator D was drawn out from the top of the phase separator D through a tube 10, heat-exchanged with the polymer solution feed line by means of a heat exchanger H, then cooled by means of a heat exchanger G, and thereafter recycled to the polymerization reactor C.

The solution of ethylene/1-butene copolymer was drawn out from the tubes 9, 10 and 11, respectively, as a sample, and each sample was measured on the concentration of the ethylene/1-butene copolymer in the solution. As a result, the concentration of the ethylene/1-butene copolymer in the solution obtained from the tube 9 was 70 g/liter-solvent, that from the tube 10 was 1.2 g/liter-solvent, and that from the tube 11 was 511 g/liter-solvent. Accordingly, it was confirmed that the polymer solution was concentrated in the phase separator D up to a polymer concentration of as much as about 7.3 times of the initial concentration. Further, it was also confirmed that the heat energy consumption in the heat exchangers I, J and K was reduced to about ⅓ of the heat energy consumption therein in the case of not using a phase separator. The copolymer concentration in the dilute phase was low, that is, 1.2 g/liter-solvent, and any scale deposit caused by polymer deposition or the like was not found during the cooling stage in the heat exchanger G, and a long time operation of the device became possible.

Example 10

[Copolymerization of ethylene and propylene]

A test for the phase separation of a polymer solution was conducted using a continuous polymerization device shown in FIG. 4 in the same manner as described in Example 9.

That is, to a 300-liter continuous polymerization reactor C were continuously fed hexane having been dehydrated and purified at a feed rate of 37.2 l/hr through a tube 6, a hexane solution of tributylaluminum (2.5 mmol/l) at a feed rate of 4 l/hr through a tube 7, the hexane slurry of methylaluminoxane (3) (methylaluminoxane: 2.04 mg·atom/l in terms of aluminum atom) at a feed rate of 7.9 l/hr and a hexane solution of bis(1,3-dimethylcyclopentadienyl)zirconium dichloride (0.072 mmol/l) at a feed rate of 0.9 l/hr, the total amount of hexane fed to the reactor being 50 l/hr. At the same time, to the polymerization reactor C were continuously fed ethylene at a feed rate of 4.2 kg/hr, propylene at a feed rate of 5.3 kg/hr and hydrogen at a feed rate of 1.2 l/hr through tubes 4 and 5, to perform polymerization under the conditions of a polymerization temperature of 80° C. total pressure of 7.4 kg/cm$^2$·G and a residence time of 2 hours.

A solution of ethylene/propylene copolymer produced in the polymerization reactor C was continuously discharged from the reactor through a tube 8 at a flow rate of 57 l/hr, then the temperature of the solution was elevated to 200° C. (thereby the pressure becoming to 50 kg/cm$^2$·G), and fed to a phase separator D.

In the phase separator D, the solution of ethylene/propylene copolymer was separated into a concentrated phase containing most of the ethylene copolymer and a dilute phase containing a small amount of polymer. The concentrated phase (lower phase portion) was fed into a heat exchanger K through a tube 11 at a rate of 16.5 l/hr, and was further fed into a hopper E, wherein the solvent was removed from the solution by evaporation to obtain an ethylene/propylene copolymer at a rate of 5.3 kg/hr.

The ethylene/propylene copolymer thus obtained had an intrinsic viscosity $[\eta]$ of 1.25 dl/g and an ethylene content measured by means of $^{13}$C-NMR of 82.6% by mol.

On the other hand, the dilute phase separated in the phase separator D was drawn out from the top of the phase separator D through a tube 10 at a flow rate of 40.5 l/hr, heat-exchanged with the polymer solution feed line by means of a heat exchanger H, then cooled by means of a heat exchanger G, and thereafter recycled to the polymerization reactor C.

The solution of ethylene/propylene copolymer was drawn out from the tubes 9, 10 and 11, respectively, as a sample, using a sampling container and the concentration of the ethylene/propylene copolymer in the each solution was measured. As a result, the concentration of the ethylene/propylene copolymer in the solution obtained from the tube 9 was 112 g/liter-solvent, that from the tube 10 was 9 g/liter-solvent, and that from the tube 11 was 520 g/liter-solvent. Accordingly, it was confirmed that the polymer solution was concentrated in the phase separator D up to a polymer concentration of as much as about 4.6 times of the initial concentration. Further, it was also confirmed that the heat energy consumption in the heat exchangers I, J and K was reduced to about ⅓ of the heat energy consumption therein in the case of not using a phase separator. The copolymer concentration in the dilute phase was low, that is, 9 g/liter-solvent, and any scale deposit caused by polymer deposition or the like was not found during the cooling stage in the heat exchanger G, and a long time operation of the device became possible.

Example 11

[Copolymerization of ethylene, propylene and diene]

Copolymerization of ethylene, propylene and 7-methyl-1,6-octadiene was conducted in the similar manner to that described in Example 9. That is, to a polymerization reactor C were continuously fed hexane having been dehydrated and purified at a feed rate of 35.5 l/hr through a tube 6, 7-methyl-1,6-octadiene at a feed rate of 2 l/hr, a hexane solution of tributylaluminum (2.5 mmol/l) at a feed rate of 4 l/hr through a tube 7, the hexane slurry of methylaluminoxane (3) (methylaluminoxane: 2.04 mg·atom/l in terms of aluminum atom) at a feed rate of 7.4 l/hr and a hexane solution of bis(1,3-dimethylcyclopentadienyl)zirconium dichloride (0.072 mmol/l) at a feed rate of 1.1 l/hr, the total amount of hexane fed to the reactor being 50 l/hr. At the same time, to the polymerization reactor C were continuously fed ethylene at a feed rate of 4.2 kg/hr, propylene at a feed rate of 5.8 kg/hr and hydrogen at a feed rate of 0.4 l/hr through tubes 4 and 5, respectively, to perform polymerization under the conditions of a polymerization temperature of 60° C., a total pressure of 8.1 kg/cm$^2$·G and a residence time of 2 hours.

A solution of ethylene/propylene/diene copolymer produced in the polymerization reactor C was discharged from the reactor through a tube 8, then the temperature of the solution was elevated, and was fed to a phase separator In the phase separator D, the solution of ethylene/propylene/diene copolymer was separated into a concentrated phase and a dilute-phase. The concentrated phase containing most of the ethylene/propylene/diene copolymer was discharged from the phase separator D through a tube 11, and was fed by way of a heat exchanger K to a hopper E, wherein the solvent was removed from the solution by evaporation to obtain an ethylene/propylene/7-methyl-1,6-octadiene copolymer at a rate of 4.9 kg/hr.

The ethylene/propylene/7-methyl-1,6-octadiene copolymer thus obtained had an intrinsic viscosity [η] of 2.5 dl/g, an ethylene content of 76.8% by mol and an iodine value of 11.0.

As a result of the above process, similarly to the case of Example 9, it was confirmed that the heat energy consumption in the heat exchangers I, J and K was reduced, any scale deposit caused by polymer deposition or the like was not found during the cooling stage in the heat exchanger G, and a long time operation of the device was possible.

Comparative Example 1

[Copolymerization of ethylene and 1-butene]

An example of the process for preparing an ethylene/1-butene copolymer in which a Ziegler type catalyst is used in the polymerization and a procedure of phase separation is included is described as Comparison Example 2.

[Preparation of catalyst]

In 50 liters of hexane having been dehydrated and purified was suspended 10 mol of commercially available magnesium chloride anhydride in a stream of nitrogen, and to the resulting suspension was dropwise added under stirring 60 mol of ethanol over 1 hour to perform a reaction for 1 hour at room temperature. Then, to the resulting mixture was dropwise added 28 mol of ethylaluminum sesquichloride at room temperature, and the mixture was stirred for 1 hour. Successively, 75 mol of titanium tetrachloride was added to the mixture, and then the temperature of the reaction system was elevated to 80° C. to perform a reaction for 3 hours under stirring of the mixture. From the reaction mixture, a solid portion was separated by means of decantation, and the solid portion was repeatedly washed with purified hexane to give a hexane suspension. The titanium concentration in the hexane suspension was measured by means of titration.

[Polymerization]

The procedure for the copolymerization of ethylene and 1-butene in Example 9 was repeated except for using the above-obtained catalyst as a catalyst. That is, to a 300-liter polymerization reactor shown in FIG. 4 were continuously fed hexane at a feed rate of 93.2 l/hr through a tube 6, a hexane solution of ethylaluminum sesquichloride (2.0 mmol/l) at a feed rate of 2.9 l/hr through a tube 7 and a hexane slurry of the above titanium catalyst supported on a carrier (titanium catalyst: 0.1 mmol/l in terms of Ti) at a feed rate of 3.9 l/hr, the total amount of hexane fed to the reactor being 100 l/hr. At the same time, to the polymerization reactor were continuously fed ethylene at a feed rate of 11 kg/hr, 1-butene at a feed rate of 10 kg/hr and hydrogen at a feed rate of 22.5 l/hr through tubes 4 and 5, to perform polymerization under the conditions of a polymerization temperature of 140° C., a pressure of 20 kg/cm$^2$·G and a residence time of 50 minutes.

A solution of ethylene/1-butene copolymer produced in the polymerization reactor C was continuously discharged from the reactor through a tube 8 at a flow rate of 125 l/hr, then the temperature of the solution was elevated to 200° C. (thereby the pressure becoming to 40 kg/cm$^2$·G), and fed to a phase separator D.

In the phase separator D, the copolymer solution thus fed was separated, and the resulting concentrated phase containing most of the copolymer was discharged from the phase separator D through a tube 11 at a rate of 36 l/hr, and was fed by way of a heat exchanger K to a hopper E, wherein the solvent was removed from the concentrated phase by evaporation to obtain an ethylene/1-butene copolymer at a rate of 12 kg/hr. The ethylene/1-butene copolymer thus obtained had an intrinsic viscosity [η] of 1.7 dl/g and an ethylene content of 90% by mol.

On the other hand, the dilute phase separated in the phase separator D was drawn out from the top of the phase separator D at a rate of 89 l/hr through a tube 10, heat-exchanged with the polymer solution feed line by means of a heat exchanger H, then cooled by means of a heat exchanger G, and thereafter recycled to the polymerization reactor C.

The solution of ethylene/1-butene copolymer was drawn out from the tubes 9, 10 and 11, respectively, as a sample, and each sample was measured on the concentration of the ethylene/1-butene copolymer in the solution, in the same manner as described in Example 9. As a result, the concentration of the ethylene/1-butene copolymer in the solution obtained from the tube 9 was 113 g/liter-solvent, that from the tube 10 was 6 g/liter-solvent, and that from the tube 11 was 531 g/liter-solvent.

Each of the ethylene/1-butene copolymers obtained in Example 9 and Comparative Example 2 was extruded at 200° C. using a T-die of 30 mm and was rapidly cooled using a chill roll of 27° C., to obtain a film of 50 μm. The results obtained by measuring physical properties of the film are set forth in Table 1. The film obtained from the polymer of Example 9 was such an excellent film that changes of optical characteristics and heat-sealing strength with time were small.

TABLE 1

Physical properties of ethylene/1-butene copolymer film of 50 μm

| Sample | Haze % | Glossiness % | Heat-sealing strength (90° C.) g/15 mmφ |
|---|---|---|---|
| Sample A | 2.8 | 119 | 600 |
| Sample B | 6.9 | 159 | 547 |
| Sample C | 3.6 | 115 | 546 |
| Sample D | 12.4 | 169 | 46 |

Sample A: immediately after the preparation of a film of the ethylene/1-butene copolymer obtained in Example 9.
Sample B: after the lapse of 14 days at 40° C. from the preparation of a film of the ethylene/1-butene copolymer obtained in Example 9.
Sample C: immediately after the preparation of a film of the ethylene/1-butene copolymer obtained in Comparative Example 2.
Sample D: after the lapse of 14 days at 40° C. from the preparation of a film of the ethylene/1-butene copolymer obtained in Comparative Example 2.

What is claimed is:

1. A process for the preparation of polyolefin comprising polymerizing or copolymerizing olefin by a solution polymerization method in the presence of a catalyst for olefin polymerization comprising (A) a metallocene compound of a transition metal selected from the group consisting of zirconium, hafnium and titanium, and (B) an aluminoxane compound having a specific surface area of not less than 100 m$^2$/g;

wherein the aluminoxane compound (B) is added to the polymerization system in the form of a slurry of said aluminoxane compound (B) in a liquid $C_5$ to $C_7$ aliphatic hydrocarbon or alicyclic hydrocarbon or mixture thereof, having a boiling point of not higher than 100° C., which aluminoxane compound (B) is prepared by a process comprising bringing a toluene solution of the aluminoxane compound (B) into contact with the $C_5$ to $C_7$ aliphatic or alicyclic hydrocarbon or mixture thereof to precipitate the aluminoxane compound (B), separating the aluminoxane by filtration and then dispersing the aluminoxane in the $C_5$ to $C_7$ aliphatic or alicyclic hydrocarbon or mixture to form the slurry, the metallocene compound (A) is added to the polymerization system in the form of a slurry or a solution of $C_5$ to $C_7$ aliphatic hydrocarbon or alicyclic hydrocarbon or mixture thereof, which is prepared separately from the slurry of said aluminoxane compound (B), and the polymerization is carried out in the presence of a diluent consisting essentially of $C_5$ to $C_7$ aliphatic hydrocarbon or the alicyclic hydrocarbon or mixture thereof having a boiling point not higher than 100° C.

2. The process as claimed in claim 1, wherein the polymer solution is fed to a separation zone kept at a temperature above the upper cloud point of the polymer solution to a temperature higher than the upper cloud point by about 180° C. to separate the polymer solution into a lower phase portion containing the polyolefin in a high concentration in the $C_5$ to $C_7$ aliphatic hydrocarbon or alicyclic hydrocarbon or mixture thereof and an upper phase portion containing the polyolefin in low concentration in the $C_5$ to $C_7$ aliphatic hydrocarbon or alicyclic hydrocarbon or mixture thereof, so as to recover the polyolefin from the lower phase portion in the separation zone, and recycling at least a portion of the liquid of the upper phase to the polymerization zone.

3. The process as claimed in claim 1, wherein said catalyst for olefin polymerization further comprises (C) an organoaluminum compound.

4. The process as claimed in claim 1, wherein the olefin subjected to polymerization or to the copolymerization is a member selected from the group consisting of ethylene, α-olefin, diene and mixtures thereof.

5. A process for the preparation of polyolefin having an intrinsic viscosity of from 0.7 to 10 dl/g, said process comprises polymerization or copolymerizing olefin by a solution polymerization method in the presence of a catalyst for olefin polymerization comprising (A) a metallocene compound of a transition metal selected from the Group IVB of the periodic table, (B) an aluminoxane compound having a specific surface area of not less than 100 m$^2$/g, and (C) an organoaluminum compound;

wherein the polymerization is carried out in the presence of a solvent consisting essentially of a $C_5$ to $C_7$ aliphatic hydrocarbon or alicyclic hydrocarbon or mixture thereof, having a boiling point of not higher than 100° C., which aluminoxane compound (B) is prepared by a process comprising bringing a toluene solution of the aluminoxane compound (B) into contact with the $C_5$ to $C_7$ aliphatic or alicyclic hydrocarbon or mixture thereof to precipitate the aluminoxane compound (B), separating the aluminoxane by filtration and then dispersing the aluminoxane in the $C_5$–$C_7$ aliphatic hydrocarbon or alicyclic hydrocarbon or mixture thereof to form the slurry, the metallocene compound (A) is added to the polymerization system in the form of a solution or a slurry of said metallocene compound (A) in the solvent used for the solution polymerization, the aluminoxane compound (B) is prepared separately from the metallocene compound (A) and is added to the polymerization system in the form of a slurry of said aluminoxane compound (B) in the solvent used for the solution polymerization, the organoaluminum compound (C) is added to the polymerization system in the form of a solution of said organoaluminum compound (C) in the solvent used for the solution polymerization, and olefin monomers are added to the polymerization system and the polymerization or copolymerization is carried out to obtain a polymer solution.

6. The process as claimed in claim 5, wherein the polymer solution is fed to a separation zone kept at a temperature above upper cloud point of the polymer solution to separate the polymer solution into a lower phase portion containing the polyolefin in a high concentration in the solvent and an upper phase portion containing the polyolefin in low concentration in the solvent, and recycling at least a portion of the liquid of the upper phase to the polymerization zone.

7. The process as claimed in claim 5, wherein the olefin subjected to polymerization or to copolymerization is a member selected from the group consisting of ethylene, α-olefin, and diene and mixtures thereof.

8. A process for the preparation of polyolefin comprising polymerization or copolymerizing olefine which is a member selected from the group consisting of ethylene, α-olefin, diene and mixtures thereof, by a solution polymerization method in the presence of a catalyst for olefin polymerization comprising (A) a metallocene compound of a transition metal selected from the group consisting of zirconium, hafnium and titanium, (B) an aluminoxane compound having a specific surface area of not less than 100 m$^2$/g, and (C) an organoaluminum compound;

wherein the aluminoxane compound (B) is added to the polymerization system in the form of a slurry of said aluminoxane compound (B) in a liquid $C_5$ to $C_7$ aliphatic hydrocarbon or alicyclic hydrocarbon or mixture thereof, having a boiling point of not higher than 100° C. which aluminoxane compound (B) is prepared by a process comprising bringing a toluene solution of the aluminoxane compound (B) into contact with the $C_5$ to $C_7$ aliphatic hydrocarbon or alicyclic hydrocarbon or mixture thereof to precipitate the aluminoxane compound (B), separating the aluminoxane by filtration and then dispersing the aluminoxane in the $C_5$ to $C_7$ aliphatic or alicyclic hydrocarbon or mixture to form the slurry, the metallocene compound (A) is added to the polymerization system in the form of a slurry or a solution of $C_5$ to $C_7$ aliphatic hydrocarbon or alicyclic hydrocarbon or mixture thereof, and the organoaluminum compound (C) is added in the form of a solution of $C_5$ to $C_7$ aliphatic hydrocarbon or alicyclic hydrocarbon or mixture thereof, wherein the compounds (A) and (C) solutions or slurry are prepared separately from the slurry of said aluminoxane compound (B), and the polymerization is carried out in the presence a diluent consisting essentially of $C_5$ to $C_7$ aliphatic hydrocarbon or alicyclic hydrocarbon or mixture thereof having a boiling point not higher than 100° to obtain a polymer solution.

9. The process as claimed in claim 8, wherein the polymer solution is fed to a separation zone kept at a temperature above the upper cloud point of the polymer solution to a temperature higher than the upper cloud point by about 180° C. to separate the polymer solution into a lower phase portion containing the polyolefin in a high concentration in the $C_5$ to $C_7$ aliphatic hydrocarbon or alicyclic hydrocarbon or mixture thereof, and an upper phase portion containing catalyst and the polyolefin in low concentration in the $C_5$ to $C_7$ aliphatic hydrocarbon or alicyclic hydrocarbon or mixture thereof, and recycling at least a portion of the liquid of the upper phase to the polymerization zone.

10. The process as claimed in claim 8, wherein the organoaluminum compound (C) is an alkylaluminum compound or an alkylaluminum halide compound.

11. A continuous process for the preparation of polyolefin comprising polymerizing or copolymerizing olefin, which is a member selected from the group consisting of ethylene, α-olefin, diene and mixtures thereof by a solution polymerization method in a liquid solvent phase in the presence of a catalyst for olefin polymerization comprising (A) a zirconium metallocene compound, (B) a methyl aluminoxane compound having a specific surface area of not less that 100 m²/g, and (C) a trialkyl aluminum compound;

wherein the compound (B) is added to the polymerization system in the form of a slurry of said compound (B) in a solvent consisting essentially of a $C_6$ aliphatic hydrocarbon or alicyclic hydrocarbon or mixture thereof, having a boiling point no higher than 100° C., which aluminoxane compound (B) is prepared by a process comprising bringing a toluene solution of the compound (B) into contact with $C_6$ aliphatic or alicyclic hydrocarbon or mixture thereof to precipitate the compound (B), separating the compound (B) by filtration and then dispersing the compound (B) in $C_6$ aliphatic or alicyclic hydrocarbon or mixture to form the slurry, the compound (A) is added to the polymerization system in the form of a slurry or a solution of $C_6$ aliphatic hydrocarbon or alicyclic hydrocarbon or mixture thereof and the compound (C) is added in the form of a solution of $C_6$ aliphatic hydrocarbon or alicyclic hydrocarbon or mixture thereof, wherein the compounds (A) and (C) solutions or slurry are prepared separately from the slurry of said compound (B), wherein said process provides the capability of adjusting the amount of each catalyst component (A), (B) and (C) during the polymerization process by individually adjusting the amount of each catalyst component added to the polymerization zone during the polymerization process, and the polymerization is carried out in the presence of a diluent consisting essentially of $C_6$ aliphatic hydrocarbon or alicyclic hydrocarbon or mixture thereof to obtain a polymer solution and the polymer solution is fed to a separation zone kept at a temperature above the upper cloud point of the polymer solution to a temperature higher than the upper cloud point by 180° C. to separate the polymer solution into a lower phase portion containing the polyolefin in a high concentration in the $C_6$ aliphatic hydrocarbon or alicyclic hydrocarbon or mixture thereof and an upper phase portion containing the polyolefin in low concentration, in the $C_6$ aliphatic hydrocarbon or alicyclic hydrocarbon or mixture thereof, and recycling at least a portion of the liquid of the upper phase and the catalyst to the polymerization zone.

12. A continuous process for the preparation of polyolefin comprising copolymerizing (i) 30–95% by mol of ethylene, (ii) 5–70% by mol of α-olefin having 3–20 carbon atoms and (iii) 0–10% by mol of non-conjugated diene by a solution polymerization method in the presence of a catalyst for olefin polymerization comprising (A) a metallocene compound of a transition metal selected from the group consisting of zirconium, hafnium and titanium, (B) an aluminoxane compound having a specific surface area of not less than 100 m²/g, and (C) an organoaluminum compound;

wherein the polymerization is carried out in the presence of a solvent formed from an aliphatic hydrocarbon or alicyclic hydrocarbon or mixture thereof, having a boiling point of not higher than 100° C., the metallocene compound (A) is continuously added to the polymerization system in the form of a solution or a slurry of said metallocene compound (A) in the solvent used for the solution polymerization, the aluminoxane compound (B) which is prepared separately from the metallocene compound (A) is continuously added to the polymerization system in the form of a slurry of said aluminoxane compound (B) in the solvent used for the solution polymerization, the organoaluminum compound (C) which is prepared separately from the metallocene compound (A) and the aluminoxane compound (B) is continuously added to the polymerization system in the form of a solution of said organoaluminum compound (C) in the solvent used for the solution polymerization, the olefin monomers are continuously added to the polymerization system and the copolymerization is carried out under such conditions that the polymer concentration is 50–150 g/liter and the polymer solution is homogeneous, the polymer solution is fed to a separation zone kept at a temperature above upper cloud point of the polymer solution to separate the polymer solution into a lower phase portion containing the polyolefin in a high concentration and an upper phase portion containing the polyolefin in low concentration, and recycling at least a portion of the liquid of the upper phase to the polymerization zone.

13. The process of claim 12 wherein the polymerization solvent consists essentially of a $C_6$ aliphatic hydrocarbon or alicyclic hydrocarbon or mixture thereof having a boiling point of not higher than 100° C., the aluminoxane compound (B) is prepared by a process comprising bring a toluene solution of the aluminoxane compound into contact with $C_6$ aliphatic hydrocarbon or alicyclic hydrocarbon or mixture thereof to precipitate the aluminoxane compound, separating the aluminoxane by filtration and then dispersing the aluminoxane in $C_6$ aliphatic hydrocarbon or alicyclic hydrocarbon or mixture thereof to form the slurry, and recycling the liquid of the upper phase in the separation zone and the polymerization catalyst to the polymerization.

* * * * *